US012263578B2

(12) United States Patent
Allen et al.

(10) Patent No.: US 12,263,578 B2
(45) Date of Patent: Apr. 1, 2025

(54) END-EFFECTOR WITH RIDGES FOR PROCESSING OBJECTS WITH LOW POSE AUTHORITY

(71) Applicant: Berkshire Grey Operating Company, Inc., Bedford, MA (US)

(72) Inventors: Thomas Allen, Reading, MA (US); Jason Yap, Newton, MA (US); Ian Gerald Wilson, Malden, MA (US); Aidan Rose, Waban, MA (US); Mark F. Budreski, Winchester, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 91 days.

(21) Appl. No.: 17/529,508

(22) Filed: Nov. 18, 2021

(65) Prior Publication Data

US 2022/0152845 A1 May 19, 2022

Related U.S. Application Data

(60) Provisional application No. 63/115,721, filed on Nov. 19, 2020.

(51) Int. Cl.
*B25J 15/06* (2006.01)
*B25J 15/04* (2006.01)

(52) U.S. Cl.
CPC ....... *B25J 15/0683* (2013.01); *B25J 15/0408* (2013.01)

(58) Field of Classification Search
CPC .......................................................... B25J 15/06
See application file for complete search history.

(56) References Cited

U.S. PATENT DOCUMENTS

| 2,853,333 A | 9/1958 | Littell |
| 3,005,652 A | 10/1961 | Helm |
| 3,195,941 A | 7/1965 | Morey |
| 3,637,249 A | 1/1972 | Kuhl et al. |
| 3,743,340 A | 7/1973 | Williamann |
| 3,959,864 A | 6/1976 | Tell |

(Continued)

FOREIGN PATENT DOCUMENTS

| CA | 2053401 A1 | 7/1992 |
| CA | 2998128 C | 11/2023 |

(Continued)

OTHER PUBLICATIONS

Notification Concerning Transmittal of International Preliminary Report on Patentability and the International Preliminary Report on Patentability issued by the International Bureau of WIPO in related International Application No. PCT/US2021/059841 on Jun. 1, 2023, 12 pages.

(Continued)

*Primary Examiner* — Gerald McClain
(74) *Attorney, Agent, or Firm* — Gesmer Updegrove LLP

(57) ABSTRACT

An end-effector for a programmable motion device includes a body that includes a first portion having a vacuum opening through which a vacuum from a vacuum source is applied to an object, and a second portion that is adapted to engage the object. The first portion also includes ridges on a surface of the first portion to distribute the vacuum over a contact surface of the object. The first portion is generally orthogonal to the second portion.

21 Claims, 14 Drawing Sheets

(56) References Cited

U.S. PATENT DOCUMENTS

| | | | |
|---|---|---|---|
| 4,389,064 A | 6/1983 | Laverriere | |
| 4,412,775 A | 11/1983 | Molitor et al. | |
| 4,466,778 A | 8/1984 | Volkmann | |
| 4,495,968 A | 1/1985 | Kist | |
| 4,557,659 A | 12/1985 | Scaglia | |
| 4,600,229 A | 7/1986 | Oten | |
| 4,745,681 A | 5/1988 | Hollis, Jr. et al. | |
| 4,787,812 A | 11/1988 | Göpfert | |
| 4,828,304 A | 5/1989 | No et al. | |
| 4,880,358 A | 11/1989 | Lasto | |
| 4,960,364 A | 10/1990 | Tell | |
| 5,024,575 A | 6/1991 | Anderson | |
| 5,035,456 A | 7/1991 | Messinger | |
| 5,088,878 A * | 2/1992 | Focke | B65G 47/91 414/793 |
| 5,190,332 A | 3/1993 | Nagai et al. | |
| 5,192,070 A | 3/1993 | Nagai et al. | |
| 5,207,465 A | 5/1993 | Rich | |
| 5,683,227 A | 11/1997 | Nagai et al. | |
| 5,727,832 A | 3/1998 | Holter | |
| 5,752,729 A | 5/1998 | Crozier et al. | |
| 5,764,013 A | 6/1998 | Yae | |
| 5,791,861 A | 8/1998 | Seelig | |
| 5,865,487 A | 2/1999 | Gore et al. | |
| 6,015,174 A | 1/2000 | Raes et al. | |
| 6,135,522 A | 10/2000 | Su et al. | |
| 6,244,640 B1 | 6/2001 | Le Bricquer et al. | |
| 6,382,692 B1 | 5/2002 | Schmalz et al. | |
| 6,397,876 B1 | 6/2002 | Golden et al. | |
| 6,817,639 B2 | 11/2004 | Schmalz et al. | |
| 7,017,961 B1 | 3/2006 | Parnell et al. | |
| 7,140,389 B2 | 11/2006 | Schnatterer et al. | |
| 7,261,350 B2 | 8/2007 | Isetani et al. | |
| 7,263,890 B2 | 9/2007 | Takahashi | |
| 7,618,074 B2 | 11/2009 | Zimmer | |
| 7,637,548 B2 | 12/2009 | Fukano et al. | |
| 7,677,622 B2 | 3/2010 | Dunkmann et al. | |
| 7,726,715 B2 * | 6/2010 | Nagasawa | B25J 15/0616 294/189 |
| 8,070,203 B2 | 12/2011 | Schaumberger | |
| 8,096,598 B2 | 1/2012 | Perlman | |
| 8,132,835 B2 | 3/2012 | Ban et al. | |
| 8,267,386 B2 | 9/2012 | Schaaf et al. | |
| 8,565,915 B2 | 10/2013 | Dillon | |
| 8,641,329 B2 | 2/2014 | Barrios | |
| 8,662,861 B2 | 3/2014 | Tell | |
| 8,721,321 B2 | 5/2014 | Middleton et al. | |
| 8,777,284 B2 | 7/2014 | Schaller et al. | |
| 9,061,868 B1 | 6/2015 | Paulsen et al. | |
| 9,120,622 B1 | 9/2015 | Elazary et al. | |
| 9,227,323 B1 | 1/2016 | Konolige et al. | |
| 9,457,477 B1 * | 10/2016 | Rublee | B25J 15/0023 |
| 9,492,923 B2 | 11/2016 | Wellman et al. | |
| 9,604,363 B2 | 3/2017 | Ban | |
| 9,623,570 B1 | 4/2017 | Krahn et al. | |
| 9,656,813 B2 | 5/2017 | Dunkmann et al. | |
| 9,687,985 B2 * | 6/2017 | Ueno | B25J 15/0052 |
| 9,999,977 B2 | 6/2018 | Wagner et al. | |
| 10,007,827 B2 | 6/2018 | Wagner et al. | |
| 10,118,300 B2 | 11/2018 | Wagner et al. | |
| 10,315,315 B2 | 6/2019 | Wagner et al. | |
| 10,399,236 B2 | 9/2019 | Wagner et al. | |
| 10,576,641 B2 | 3/2020 | Wagner et al. | |
| 10,596,711 B2 | 3/2020 | Wagner et al. | |
| 10,710,822 B2 * | 7/2020 | Tommesani | B65G 59/04 |
| 11,945,100 B2 | 4/2024 | Wagner et al. | |
| 2001/0045755 A1 | 11/2001 | Schick et al. | |
| 2002/0011735 A1 | 1/2002 | Nagai | |
| 2002/0185575 A1 | 12/2002 | Kalb | |
| 2003/0038491 A1 | 2/2003 | Schmalz et al. | |
| 2003/0164620 A1 | 9/2003 | Schmalz et al. | |
| 2006/0242785 A1 | 11/2006 | Cawley et al. | |
| 2008/0179224 A1 | 7/2008 | Van Bossuyt | |
| 2009/0019818 A1 | 1/2009 | Gilmore et al. | |
| 2010/0040450 A1 | 2/2010 | Parnell | |
| 2010/0125361 A1 | 5/2010 | Mougin et al. | |
| 2010/0133456 A1 | 6/2010 | Baumbach et al. | |
| 2013/0129464 A1 | 5/2013 | Regan et al. | |
| 2013/0232918 A1 | 9/2013 | Lomerson et al. | |
| 2013/0232919 A1 | 9/2013 | Jaconelli | |
| 2013/0277999 A1 | 10/2013 | Schaller et al. | |
| 2014/0005831 A1 | 1/2014 | Naderer et al. | |
| 2015/0081090 A1 | 3/2015 | Dong | |
| 2015/0298316 A1 | 10/2015 | Accou et al. | |
| 2015/0328779 A1 | 11/2015 | Bowman et al. | |
| 2015/0375401 A1 | 12/2015 | Dunkmann et al. | |
| 2016/0136816 A1 | 5/2016 | Pistorino | |
| 2016/0221187 A1 | 8/2016 | Bradski et al. | |
| 2016/0244262 A1 | 8/2016 | O'Brien et al. | |
| 2016/0271805 A1 | 9/2016 | Kuolt et al. | |
| 2017/0050315 A1 | 2/2017 | Henry et al. | |
| 2017/0057091 A1 | 3/2017 | Wagner et al. | |
| 2017/0072572 A1 | 3/2017 | Wagner et al. | |
| 2017/0080571 A1 | 3/2017 | Wagner et al. | |
| 2017/0080579 A1 | 3/2017 | Wagner et al. | |
| 2017/0087718 A1 | 3/2017 | Wagner et al. | |
| 2017/0120455 A1 | 5/2017 | Wagner et al. | |
| 2018/0333866 A1 | 11/2018 | Wagner et al. | |
| 2019/0001507 A1 | 1/2019 | Wagner et al. | |
| 2019/0047787 A1 | 2/2019 | Fosnight et al. | |
| 2019/0091879 A1 | 3/2019 | Wagner et al. | |
| 2019/0299423 A1 | 10/2019 | Wagner et al. | |
| 2020/0108512 A1 | 4/2020 | Wagner et al. | |
| 2020/0164526 A1 | 5/2020 | Wagner et al. | |
| 2021/0039267 A1 | 2/2021 | Wagner et al. | |
| 2021/0171295 A1 * | 6/2021 | Azuma | B65G 61/00 |
| 2022/0040867 A1 | 2/2022 | Wagner et al. | |
| 2024/0278438 A1 | 8/2024 | Wagner et al. | |

FOREIGN PATENT DOCUMENTS

| | | | |
|---|---|---|---|
| CN | 1390438 A | 1/2003 | |
| CN | 1744970 A | 3/2006 | |
| CN | 101530954 A | 9/2009 | |
| CN | 101592498 A | 12/2009 | |
| CN | 201586976 U | 9/2010 | |
| CN | 201792340 U | 4/2011 | |
| CN | 103987637 A | 8/2014 | |
| CN | 104093992 A | 10/2014 | |
| CN | 108290297 A | 7/2018 | |
| CN | 108349093 A | 7/2018 | |
| CN | 108906907 A | 11/2018 | |
| CN | 109531554 A | 3/2019 | |
| CN | 113954106 A | 1/2022 | |
| CN | 113954107 A | 1/2022 | |
| CN | 116583385 A | 8/2023 | |
| DE | 3810989 A1 | 8/1989 | |
| DE | 10121344 A1 | 11/2002 | |
| DE | 102007054867 A1 | 5/2009 | |
| DE | 102012009011 A1 | 12/2012 | |
| DE | 102011115951 A1 | 4/2013 | |
| DE | 112018005784 T5 | 8/2020 | |
| EP | 1348873 A1 | 10/2003 | |
| EP | 1671906 A1 | 6/2006 | |
| EP | 1256421 B1 | 1/2008 | |
| EP | 2014587 A2 | 1/2009 | |
| EP | 2823899 A1 | 1/2015 | |
| EP | 2960024 A2 | 12/2015 | |
| EP | 3347172 B1 | 4/2023 | |
| EP | 3347173 B1 | 8/2023 | |
| FR | 2592827 A1 | 7/1987 | |
| FR | 2617078 A1 * | 12/1988 | |
| FR | 2928855 A1 * | 9/2009 | B25B 11/007 |
| JP | S6155399 A | 3/1986 | |
| JP | H0769470 A | 3/1995 | |
| JP | 2010201536 A | 9/2010 | |
| TW | 201400253 A | 1/2014 | |
| WO | 0064790 A1 | 11/2000 | |
| WO | 2014114619 A1 | 7/2014 | |
| WO | 2014161549 A1 | 10/2014 | |
| WO | 2015162390 A1 | 10/2015 | |
| WO | 2017035466 A1 | 3/2017 | |
| WO | 2017044627 A1 | 3/2017 | |
| WO | 2017044632 A1 | 3/2017 | |

(56) References Cited

FOREIGN PATENT DOCUMENTS

| WO | 2019230893 A1 | 12/2019 |
| WO | 2020040103 A1 | 2/2020 |
| WO | 2022109101 A1 | 5/2022 |

OTHER PUBLICATIONS

Annex to Form PCT/ISA/206 (Partial Search), Communication Relating to the Results of the Partial International Search issued by the European Patent Office (as International Searching Authority) issued in related International Application No. PCT/US2021/059841 on Mar. 9, 2022, 3 pages.

Notification of Transmittal of the International Search Report and the Written Opinion of the International Searching Authority along with the International Search Report and Written Opinion of the International Searching Authority, the European Patent Office, issued in related International Application No. PCT/US2021/059841 on May 3, 2022, 20 pages.

Anver Corporation, "Vacuum Tube Lifting Systems," Nov. 22, 2004 (http://www.jrgindustries.com/assets/anver.pdf), 36 pages.

Communication pursuant to Article 94(3) EPC issued by the European Patent Office in related European Patent Application No. 16767466.2 on Jul. 15, 2021, 5 pages.

Communication pursuant to Article 94(3) EPC issued by the European Patent Office in related European Patent Application No. 16767468.8 on Jul. 15, 2021, 5 pages.

Communication pursuant to Rules 161(1) and 162 EPC issued by the European Patent Office on Apr. 17, 2018 in related European Patent Application No. 16767466.2, 3 pages.

Communication pursuant to Rules 161(1) and 162 EPC issued by the European Patent Office on Apr. 17, 2018 in related European Patent Application No. 16767468.8, 3 pages.

Examiner's Report issued by the Canadian Intellectual Property Office on Nov. 22, 2019 in related Canadian Patent Application No. 2,998,128, 3 pages.

Examiner's Report issued by the Canadian Intellectual Property Office on Jul. 23, 2020 in related Canadian Patent Application No. 2,998,122, 3 pages.

Examiner's Report issued by the Innovation, Science and Economic Development Canada in related Canadian Patent Application No. 2,998,128 on Jul. 22, 2020, 3 pages.

Examiner's Report issued by the Innovation, Science and Economic Development Canada (Canadian Intellectual Property Office) in related Canadian Patent Application No. 2,998,128 on Feb. 9, 2021, 3 pages.

Examiner's Report issued by the Innovation, Science and Economic Development Canada Canadian Intellectual Property Office in related Canadian Patent Application No. 2,998,128 on Aug. 15, 2022, 5 pages.

Examiner's Report issued by the Innovation, Science and Economic Development Canada (Canadian Intellectual Property Office) in related Canadian Patent Application No. 3,156,185 on Aug. 29, 2023, 5 pages.

Extended European Search Report issued by the European Patent Office in related European Patent Application No. 23163114.4 on Jun. 2, 2023, 8 pages.

First Examiner's Report issued by the Canadian Intellectual Property Office on Feb. 28, 2019 in related Canadian Patent Application No. 2,998,122, 4 pages.

First Examiner's Report issued by the Canadian Intellectual Property Office on Mar. 1, 2019 in related Canadian Patent Application No. 2,998,128, 3 pages.

First Office Action, and its English translation, issued by the China National Intellectual Property Administration issued in related Chinese Patent Application No. 201680065068.5 on Jul. 6, 2020, 21 pages.

First Office Action, and its English translation, issued by the China National Intellectual Property Administration issued in related Chinese Patent Application No. 201680063679.6 on Aug. 4, 2020, 19 pages.

Herbert, Timothy M., et al., "A Robotic Gripper System for Limp Material Manipulation: Hardware and Software Development and Integration," Proceedings of the 1997 IEEE Int'l Conf. on Robotics & Automation, Albuquerque, NM, Apr. 1997, pp. 15-21.

International Preliminary Report on Patentability issued by the International Bureau of WIPO on Mar. 13, 2018 in related International Application No. PCT/US2016/050788, 8 pages.

International Search Report and Written Opinion issued by the International Searching Authority in related International Application No. PCT/US2016/050781 on Jan. 18, 2017, 16 pages.

International Search Report and Written Opinion issued by the International Searching Authority in related International Application No. PCT/US2016/050788 on Dec. 2, 2016, 12 pages.

Moura, Jauro et al., "Neural Network Based Perturbation Identification Approach for High Accuracy Tracking Control of Robotic Manipulators," Proceedings of IMECE '03, 2003 ASME Int'l Mechanical Engineering Congress, Washington, D.C., Nov. 15-21, 2003, pp. 1189-1197.

Notice on the First Office Action, along with its English translation, issued by the China National Intellectual Property Administration in related Chinese Patent Application No. 202111357085.5 on Mar. 30, 2023, 15 pages.

Notice on the First Office Action, along with its English translation, issued by the China National Intellectual Property Administration in related Chinese Patent Application No. 202111355718.9 on Mar. 31, 2023, 17 pages.

Notice on the Second Office Action and Second Office Action, along with its English translation, issued by the China National Intellectual Property Administration issued in related Chinese Patent Application No. 201680065068.5 on Mar. 4, 2021, 8 pages.

Notice on the Second Office Action and the Second Office Action, along with its English translation, issued by the China National Intellectual Property Administration issued in related Chinese Patent Application No. 201680063679.6 on May 7, 2021, 21 pages.

Vittor, Timothy, et al., "A Flexible Robotic Gripper for Automation of Assembly Tasks: A Technology Study on a Gripper for Operation in Shared Human Environments," Proceedings of the ASME, Dynamic Systems & Control Division—2003, vol. 72-22, 2003 ASME Int'l Mechanical Engineering Congress, Washington, D.C., Nov. 15-21, 2003, 6 pages.

Examiner's Report issued by the Innovation, Science and Economic Development Canada (Canadian Intellectual Property Office) in related Canadian Patent Application No. 3,178,182 on Apr. 16, 2024, 7 pages.

Examiner's Report issued by the Innovation, Science and Economic Development Canada (Canadian Intellectual Property Office) in related Canadian Patent Application No. 3,178,169 on Apr. 9, 2024, 6 pages.

Examiner's Report issued by the Innovation, Science and Economic Development Canada (Canadian Intellectual Property Office) in related Canadian Patent Application No. 3,178,166 on Apr. 9, 2024, 5 pages.

Communication pursuant to Rules 161(1) and 162 EPC issued by the European Patent Office in related European Patent Application No. 21827279.7 on Jun. 27, 2023, 3 pages.

* cited by examiner

END-EFFECTOR WITH RIDGES FOR PROCESSING OBJECTS WITH LOW POSE AUTHORITY

PRIORITY

The present application claims priority to U.S. Provisional Patent Application Ser. No. 63/115,721 filed Nov. 19, 2020, the disclosure of which is hereby incorporated by reference in its entirety.

BACKGROUND

The invention generally relates to programmable motion systems and relates in particular to end effectors for programmable motion devices (e.g., robotic systems) for use in object processing such as object sortation and object distribution.

End effectors for robotic systems, for example, may be employed in certain applications to select and grasp an object, and then move the acquired object very quickly to a new location. Applications might include picking items from a tote of items, and then placing said item in another tote or other location. In many applications, and in order to increase the range of suitable applications, the robotic picking system must be able to pick a very large range of objects. It is therefore desirable to have the end-of-arm tool be able to grip as many items as is possible.

There are many kinds of end-of-arm tools for grasping items, including parallel grippers or finger-based grippers, as well as universal gripper or jamming gripper that uses a fluidized bed concept inside a bag, electroadhesive grippers, as well as vacuum grippers. Other techniques for acquiring and securing objects employ electrostatic attraction, magnetic attraction, needles for penetrating objects such as fabrics, fingers that squeeze an object, hooks that engage and lift a protruding feature of an object, and collets that expand in an opening of an object, among other techniques. Prehensile grippers, or finger-like grippers, for example, are sometimes used for grasping objects, but such systems also face challenges in certain applications. Such systems generally require two opposing surfaces in opposition to grasp an object, and finger-like grippers are mechanically complicated, typically requiring multiple parts as well as an actuation mechanism to close and open the fingers.

Vacuum grippers employ vacuum pressure for acquiring and securing objects for transport or subsequent operations by articulated arms. Vacuum grippers however, generally require having a good seal with an object, but ensuring a good seal sometimes requires that the particular suction cup be selected to correspond to the object being grasped. Additionally, grasping certain objects, such as plastic bags, may require a specific type of end effector to ensure that the plastic bag does not peel off of the end effector or collapse under the force of the end effector and thereby break the bag and/or the seal. Further, the lifting force may be limited by an amount proportional to the area of contact of the suction cup in a vacuum system, and the vacuum itself may damage some objects.

Many such grippers however, have considerable difficulty grasping and moving objects having low pose authority (the ability to retain a particular pose when lifted or moved). For example, FIG. 1 shows at 10 a portion of an articulated arm 12 with an end effector 14 that may be, for example, a vacuum end effector. If the object 16 in the bin 18 has low pose authority, when the object if grasped and lifted (as shown in FIG. 2), a lid 20 of the object 16 may move or rotate with respect to a base 22 of the object 16. In an automated object processing system, this not only may cause the system to have poor control of the object (since the base 22 may swing or fall away), but any contents of the object may escape between the open lid 20 and the base 22.

With further reference to FIGS. 3 and 4, even if the object (e.g., box) is grasped from a long side 24 (shown in FIG. 3) or a short side 26 (shown in FIG. 4), the contents may still escape, and the top 20 may swing or become separated from the base 22. Any of these events may be problematic in an automated object processing system, which may operate independent of human personnel.

There remains a need therefore, for an end effector in a programmable motion system that may readily grasp an object having low pose authority, and then move the acquired object very quickly to a new location.

SUMMARY

In accordance with an aspect, the invention provides an end-effector for a programmable motion device. The end effector includes a body that includes a vacuum portion through which a vacuum is applied to an object, and a gripping portion that is adapted to engage the object, the vacuum portion being generally orthogonal to the gripping portion.

In accordance with another aspect, the invention provides an end-effector for a programmable motion device, the end-effector including a lid containment portion for facilitating retention of a lid of an object, and a gripping portion that is adapted to engage the object, the lid containment portion being generally orthogonal to the gripping portion.

In accordance with another aspect, the invention provides a programmable motion device for use in an object processing system. The programmable motion device includes an end-effector with a lid containment portion for facilitating retention of a lid of an object, and a gripping portion that is adapted to engage the object, the lid containment portion being generally orthogonal to the gripping portion.

In accordance with another aspect, the invention provides an object processing system for processing objects. The object processing system includes a programmable motion device with an end-effector, a control system for identifying potentially openable portions of the object, and an end-effector with a lid containment portion for facilitating retention of a lid of an object and a gripping portion that is adapted to engage the object.

In accordance with a further aspect, the invention provides a method of processing objects that includes identifying potentially openable portions of an object, and grasping the object with an end-effector including a lid containment portion for facilitating retention of a lid of an object, and a gripping portion that is adapted to engage the object.

BRIEF DESCRIPTION OF THE DRAWINGS

The following description may be further understood with reference to the accompanying drawings in which.

The drawings are shown for illustrative purposes only.

DETAILED DESCRIPTION

Figure 1:
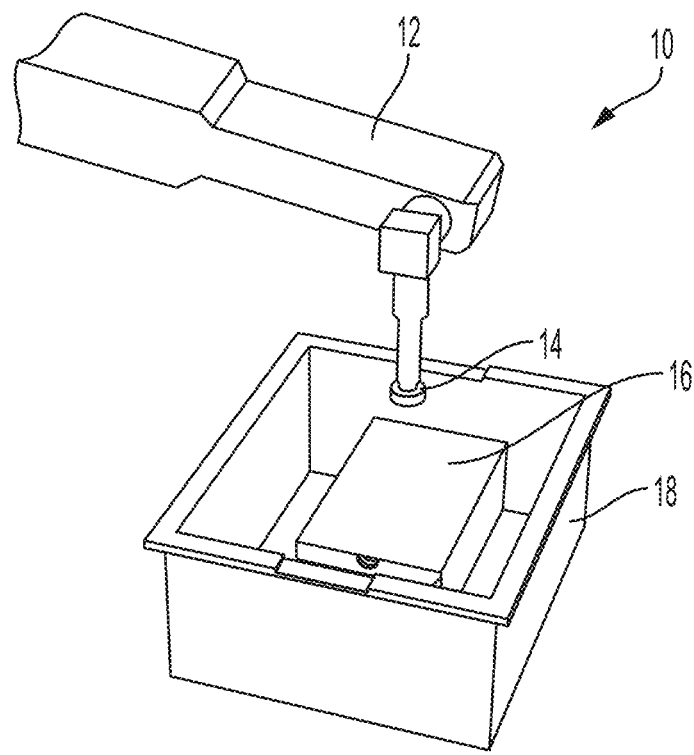
FIG. 1 shows an illustrative diagrammatic view of an end-effector of a programmable motion device prior to grasping an object in accordance with a system of the prior art.
Figure 2:
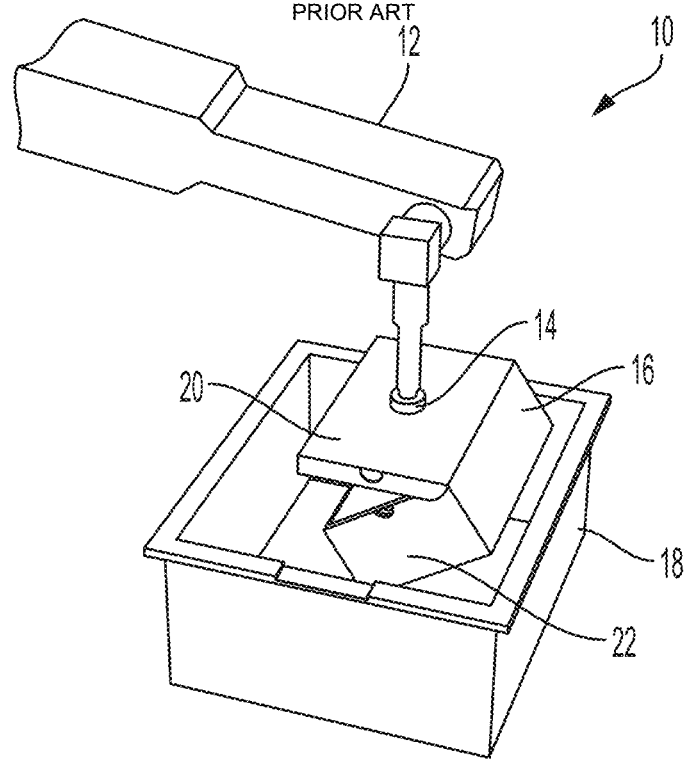
FIG. 2 shows an illustrative diagrammatic view of the end-effector of FIG. 1 while holding the object.
Figure 3:
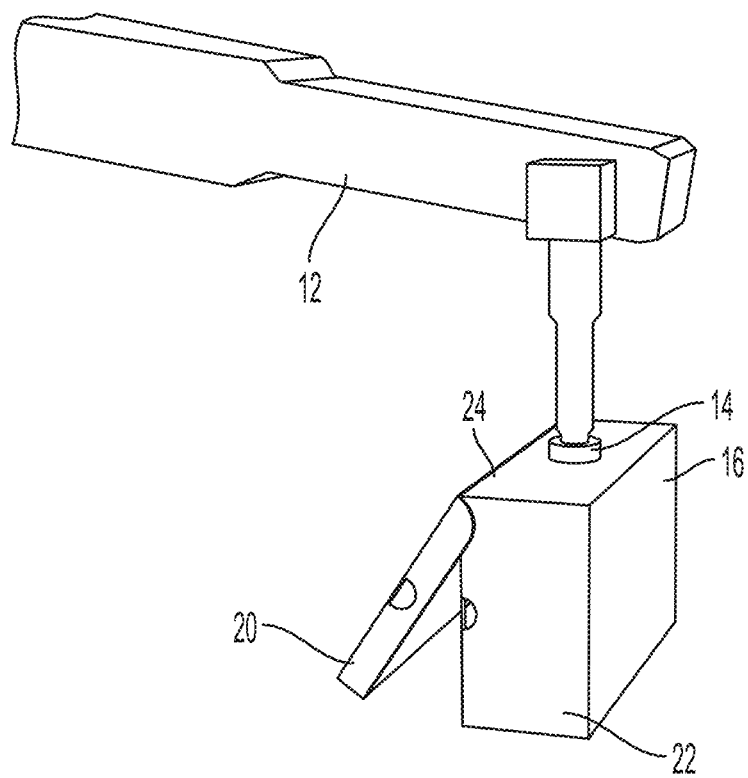
FIG. 3 shows an illustrative diagrammatic view of the end-effector of FIG. 1 while holding the object from a different grasp location.
Figure 4:
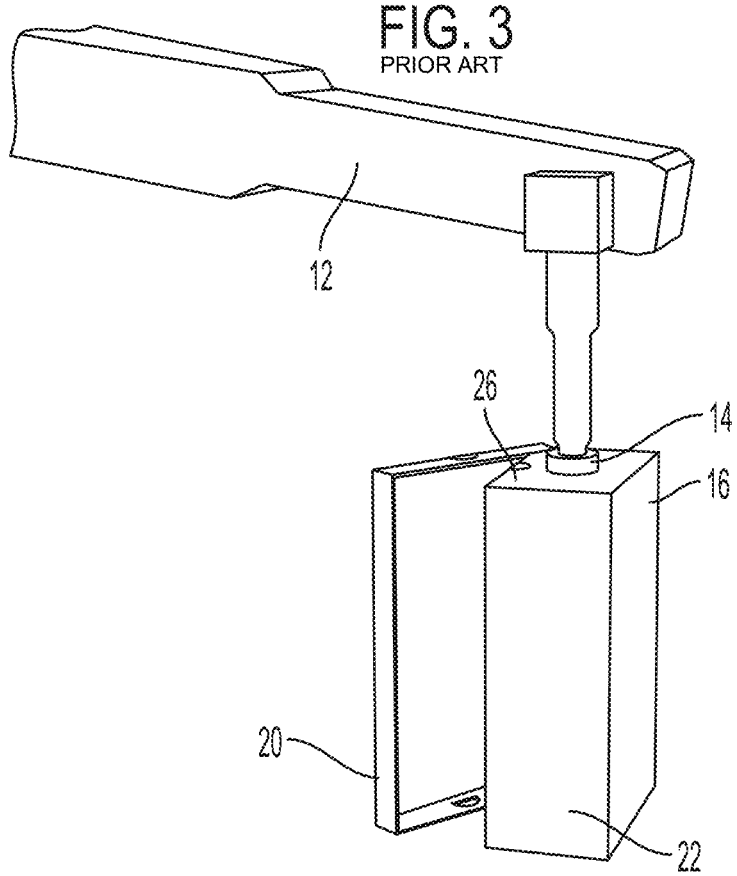
FIG. 4 shows an illustrative diagrammatic view of the end-effector of FIG. 1 while holding the object from a further grasp location.
Figure 5:
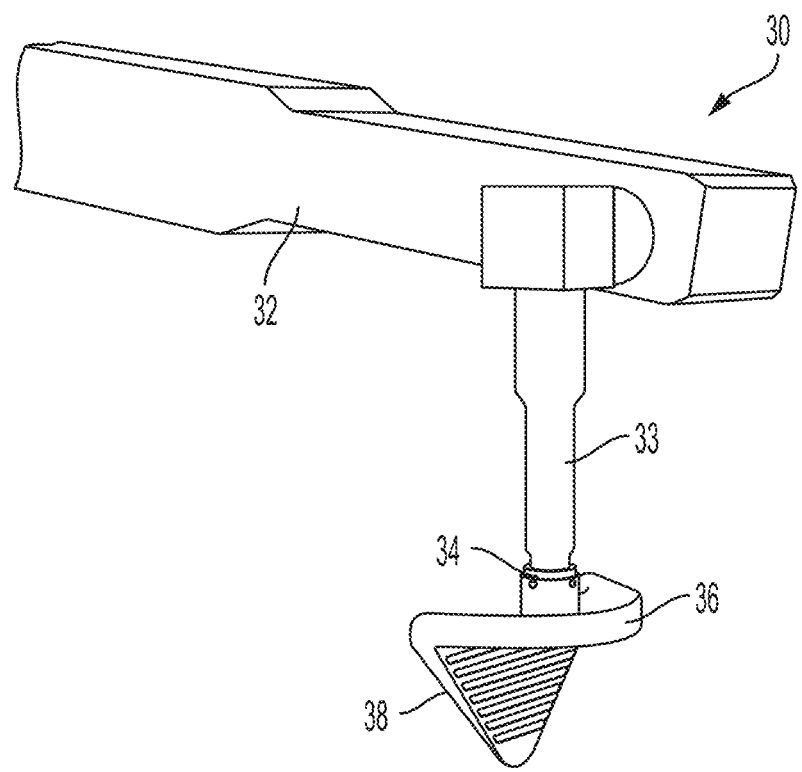
FIG. 5 shows an illustrative diagrammatic view of an end-effector of a programmable motion device in accordance with an aspect of the present invention.

In accordance with an aspect, the invention provides an end-effector that may be used with a programmable motion device in an object processing system for processing objects having low pose authority. FIG. 5 for example, shows at 30 a portion of an articulated arm 32 of a programmable motion device that includes an end-effector 34 in accordance with an aspect of the invention. FIG. 5 shows an isometric view of the end-effector 34, which includes a first portion 36 by which a vacuum is applied to an object and that facilitates containing a lid of an object as discussed further below. The end-effector 34 further includes a second portion 38 that may engage a side of an object as also discussed in more detail below.

Figure 6:
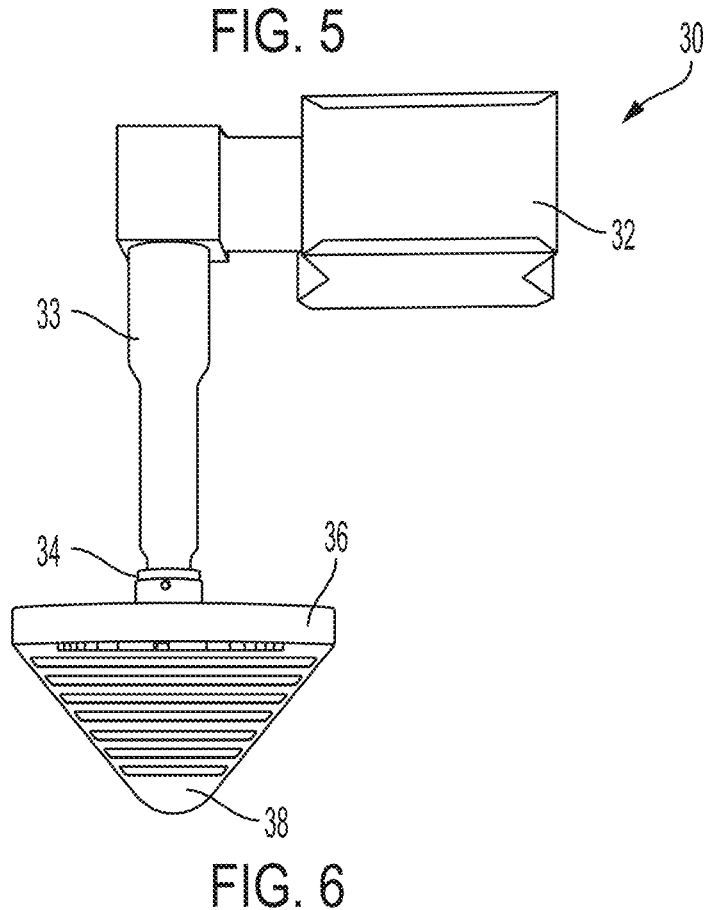
FIG. 6 shows an illustrative diagrammatic end view of the end-effector of FIG. 5.
Figure 7:
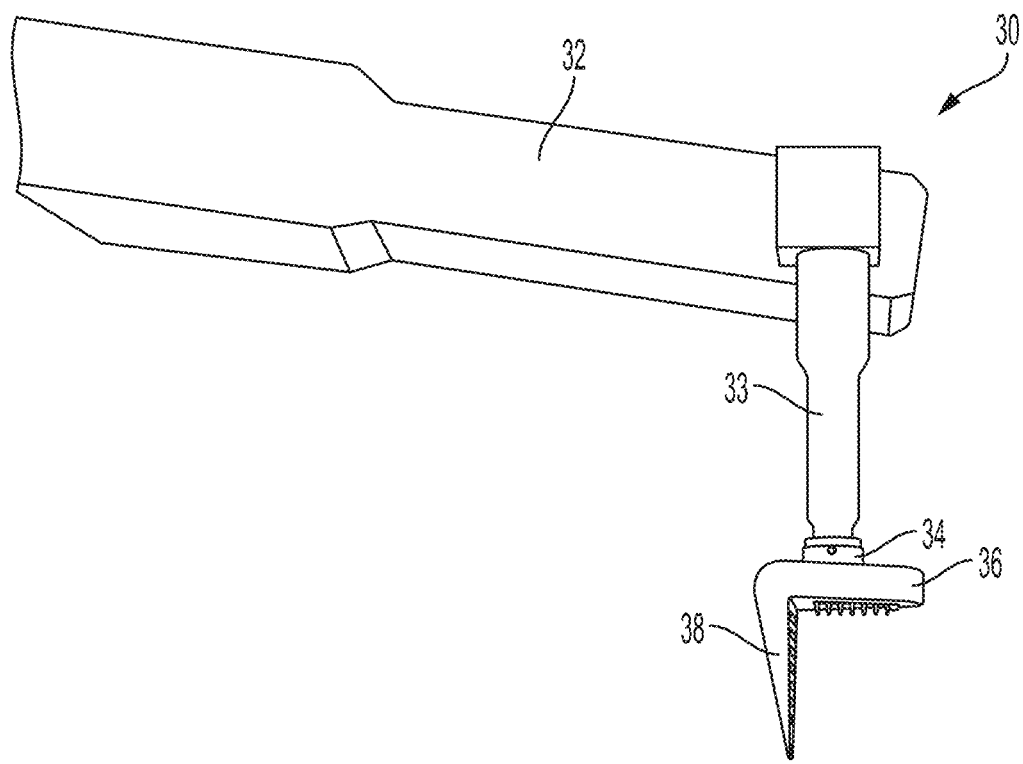
FIG. 7 shows an illustrative diagrammatic side view of the end-effector of FIG. 5.
Figure 8:
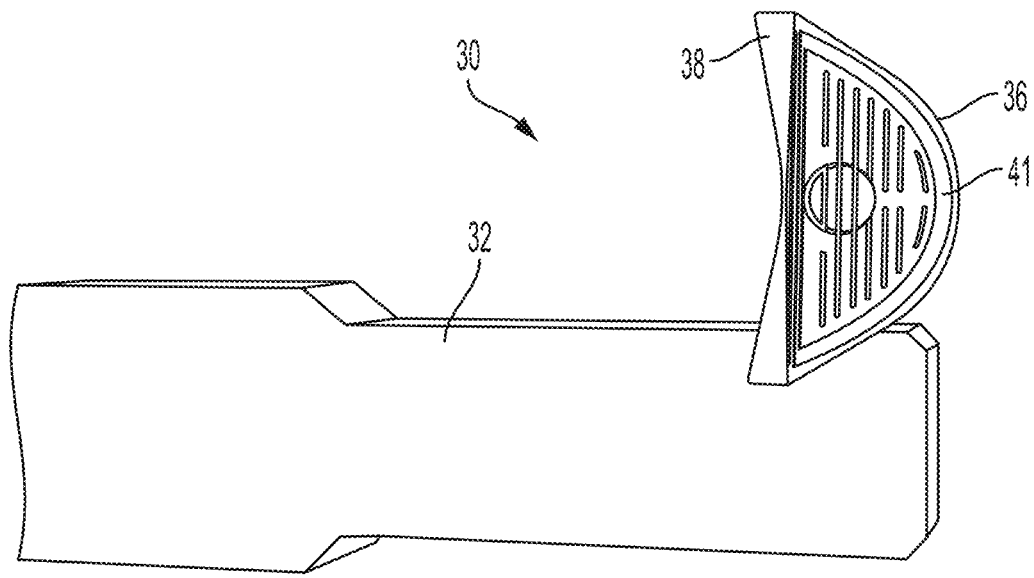
FIG. 8 shows an illustrative diagrammatic bottom view of the end-effector of FIG. 5.
Figure 9:
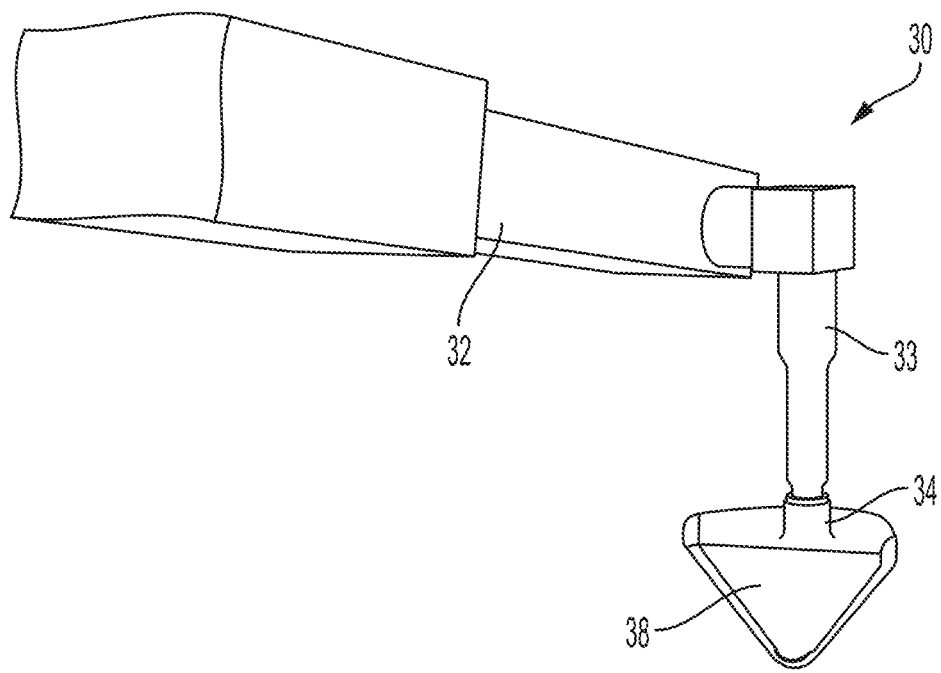
FIG. 9 shows an illustrative diagrammatic rear view of the end-effector of FIG. 5.

FIG. 6 shows a front view of the end-effector 34 with the second portion 38 facing forward. The end-effector 34 may be rotated by rotating the end-effector connection portion 33 (to which the end-effector 34 is connected) of the articulated arm 32. The first portion 36 and the second portion 38 of the end-effector 34 may be generally mutually orthogonal. FIG. 7 shows a side view of the end-effector 34 showing the general relative positional/orientation relationship between the first portion 36 and the second portion 38 of the end-effector 34. FIG. 8 shows a bottom view of the end-effector 34 with the first portion 36 facing downward, and FIG. 9 shows a rear view of the end-effector 34.

Figure 10:
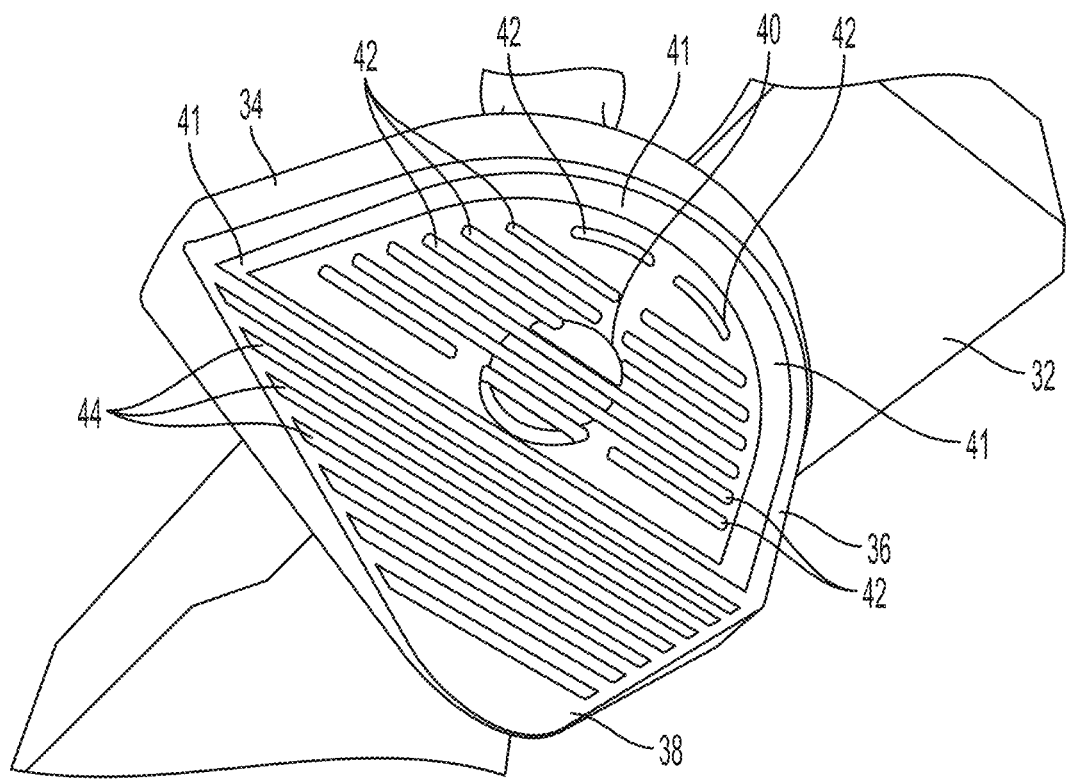
FIG. 10 shows an illustrative diagrammatic underside enlarged view of the end-effector of FIG. 5.

FIG. 10 shows an enlarged view of the first portion 36 of the end-effector 34, including a vacuum opening 40 coupled to a vacuum source. The vacuum source, for example, may be provided by a blower (with a vacuum pressure that is higher than a vacuum pressure provided by the ejector). The vacuum source therefore, may provide a vacuum pressure of no more than about 25,000 Pascals below atmospheric, with a maximum air flow rate of, for example, at least about 100 cubic feet per minute (e.g., 130-140 cubic feet per minute). The first portion 36 further includes ridges 42 (some of which cross the opening 40 as shown at 45), and the ridges facilitate distribution of the vacuum over a contact surface of the object. At least one ridge may be formed as part of a closed area 43 over the vacuum opening 40, while one or more other ridges may be open over the vacuum opening 40 as shown at 47. In this way, a portion of the vacuum opening may include a closed area of vacuum (e.g., 43), while in other areas the ridges provide vacuum flow (e.g., at 45) in a first direction (along the ridges), while in further areas, the ridge(s) may further provide vacuum flow (e.g., at 47) in a second direction (through the opening in the ridge) that is orthogonal with respect to the first direction. In this way, some portion(s) may provide more seal against the object than other portions, with the closed area providing the most seal, the ridge areas 45 providing less of a seal (due to vacuum flow along the ridges), and the ridge opening shown at 47 providing even less of a seal (due to vacuum flow along the ridges through the opening at 47). Variable levels of seal and air flow may therefore be provided in different areas at the interface of the first portion 36 and the box being grasped, permitting lighter boxes to be held by the seal, while heavier boxes are further held by the high flow vacuum.

Figure 11:
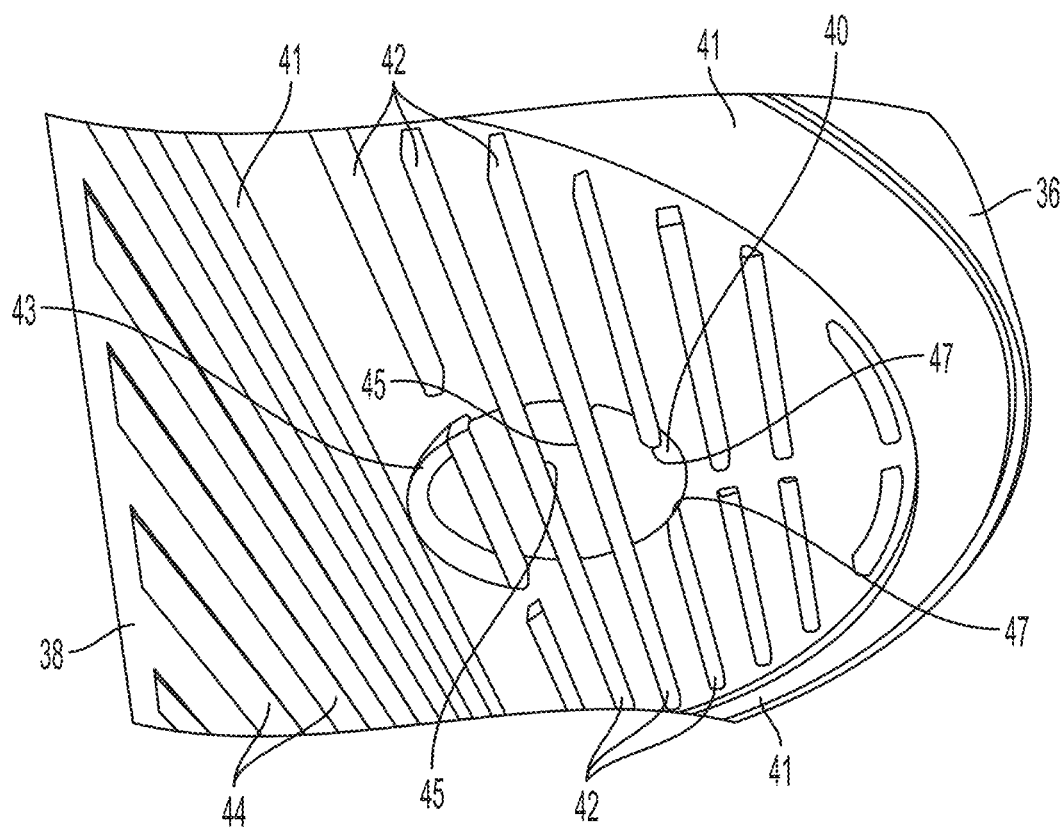
FIG. 11 shows an illustrative diagrammatic further enlarged view of the end-effector of FIG. 5.
Figure 12:
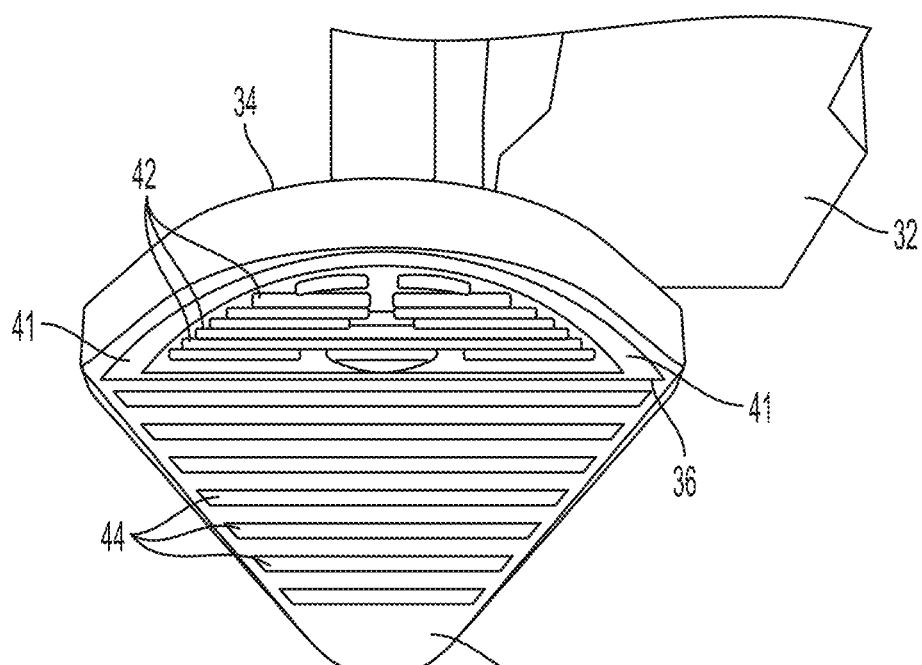
FIG. 12 shows an illustrative diagrammatic enlarged end view of the end-effector of FIG. 5.

As also shown in FIG. 10, the second portion 38 of the end-effector 34 includes non-slip surfaces 44 formed, for example, of rubber, cork, adhesive, or electro-static material etc. FIG. 11 shows an enlarged view of the first portion 36 of the end-effector 34 of FIG. 10, and FIG. 12 shows an enlarged front view of the second portion 38 of the end-effector 34 of FIG. 10. A foam or rubber seal 41 may encircle the ridges 42 and aperture 40 on the underside of the first portion 36 to facilitate the application of a vacuum to an object. The height of the foam or rubber seal 41 may be at least as high as the height of the ridges 42.

Figure 13:
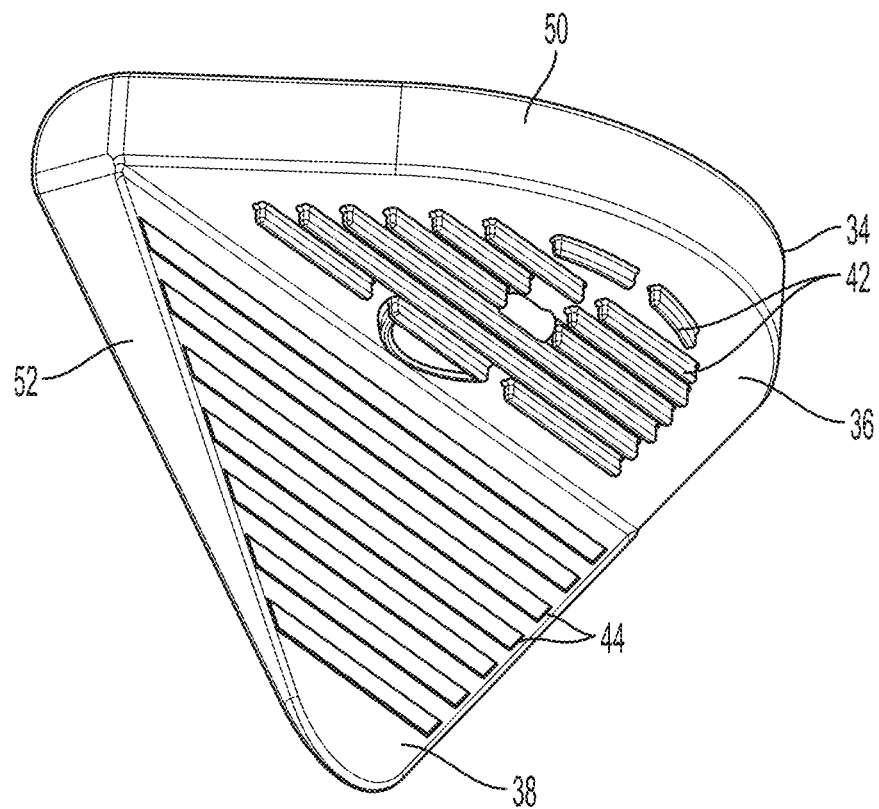
FIG. 13 shows an illustrative diagrammatic enlarged underside view of the end-effector of FIG. 5.
Figure 14:
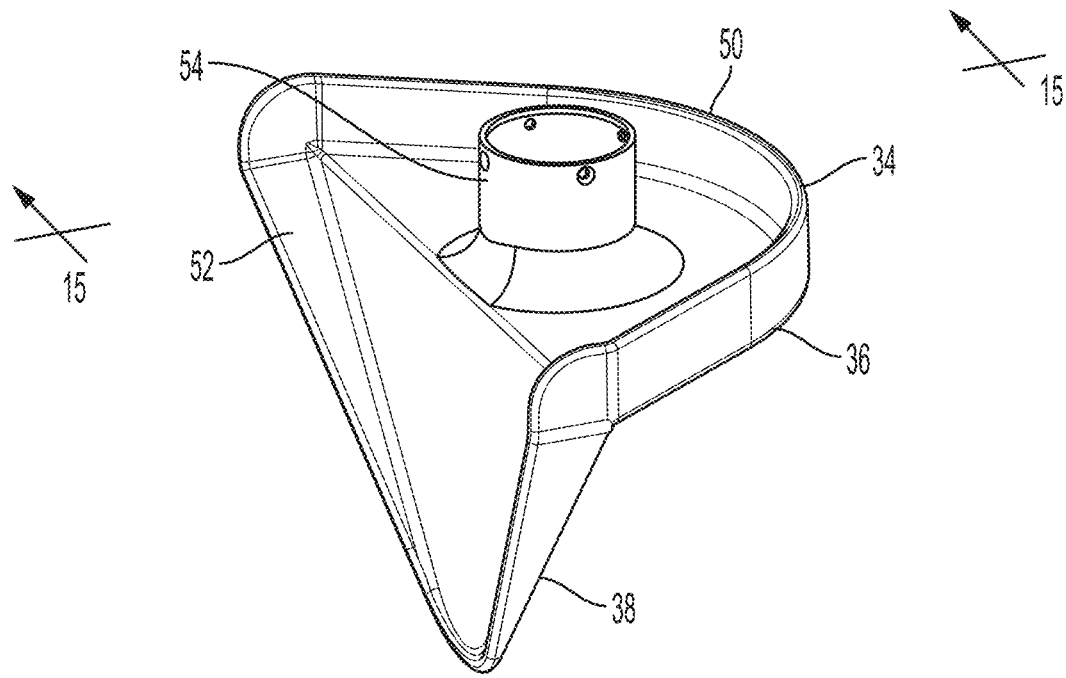
FIG. 14 shows an illustrative diagrammatic enlarged rear view of the end-effector of FIG. 5.
Figure 15:
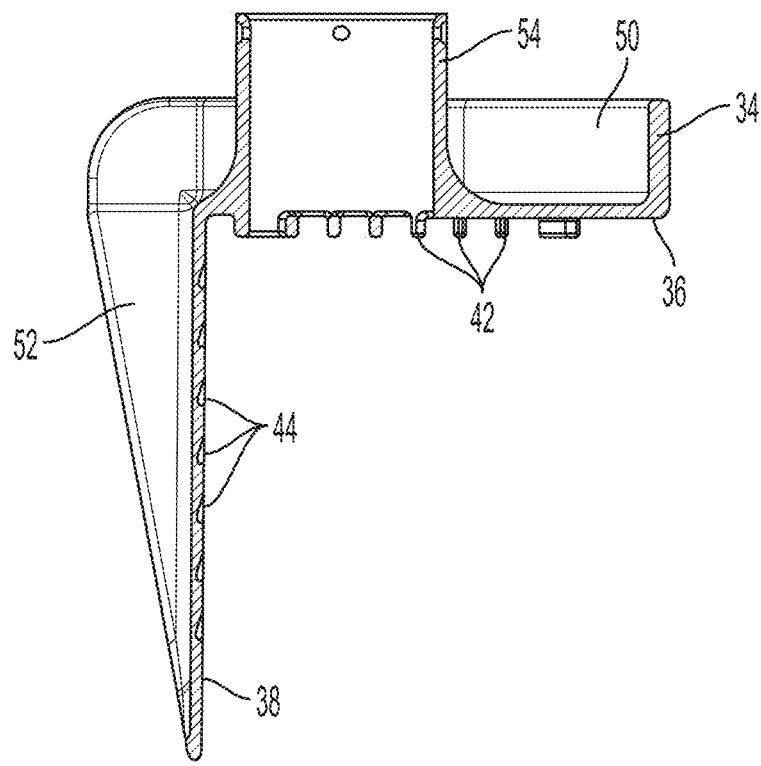
FIG. 15 shows an illustrative diagrammatic enlarged side sectional view of the end-effector of FIG. 5 taken along line 15-15 in FIG. 14.
Figure 16:
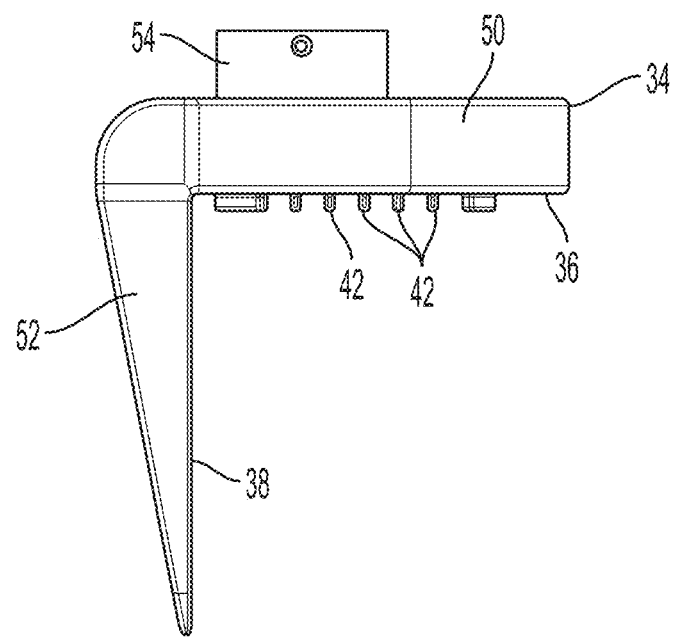
FIG. 16 shows an illustrative diagrammatic enlarged side view of the end-effector of FIG. 5.

FIG. 13 shows a more detailed underside view of the end-effector 34 showing the ridges 36 of the first portion 36, and the non-slip surfaces 44 of the second portion 38, as well as outer wall 50 of the first portion 36 and outer wall 52 of the second portion 38. FIG. 14 shows a rear view of the end-effector 34 of FIG. 13 showing the walls 50, 52, as well as a coupling member 54 for connecting to the end-effector connection portion 33 discussed above. FIG. 15 shows a side-sectional view of the end-effector 34 of FIG. 14 taken along a center of the end-effector 34 shown at 15-15. FIG. 16 shows a side view of the end-effector 34 of FIG. 14.

Figure 17A:
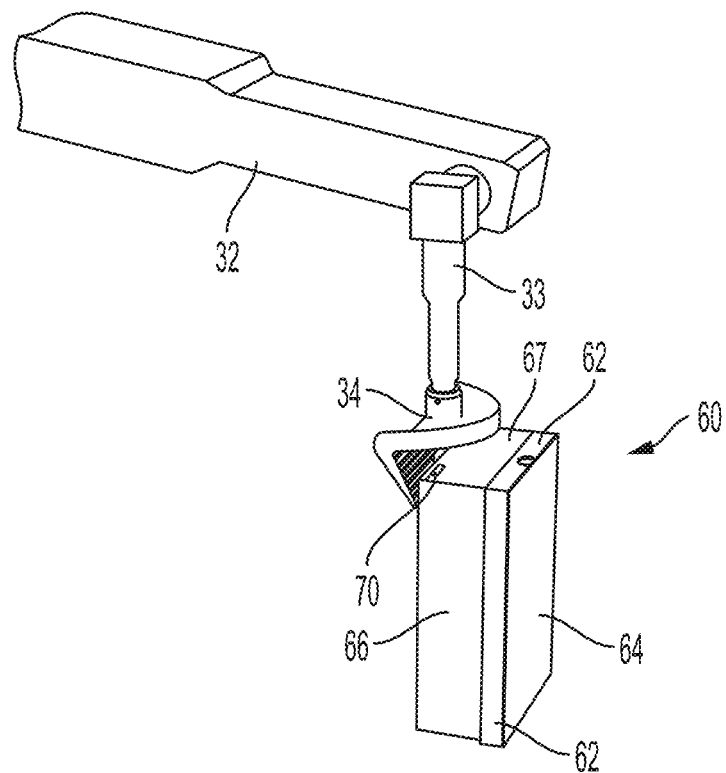
FIGS. 17A and 17B show illustrative diagrammatic views of an end-effector of FIG. 5 approaching a box to be grasped (FIG. 17A) and grasping the box (FIG. 17B)
Figure 17B:
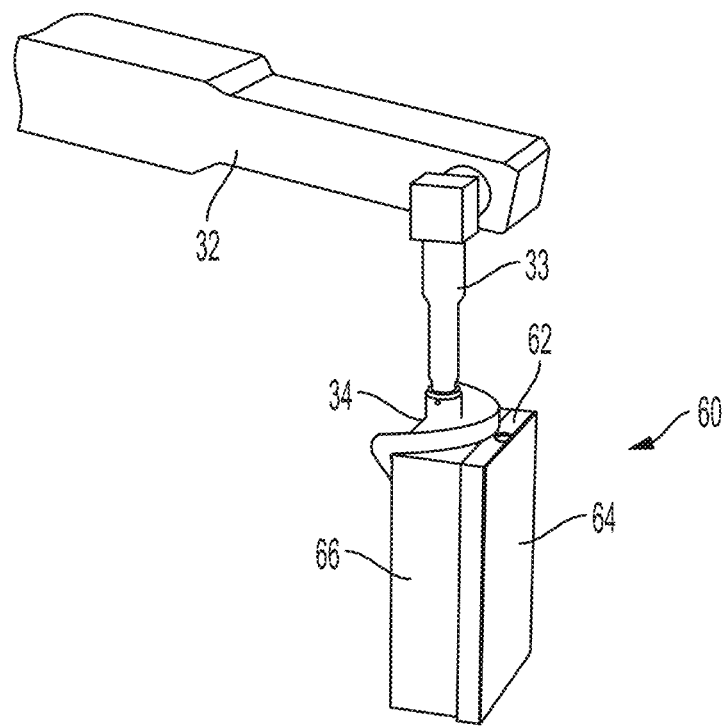

The object processing system (as discussed in further detail below with reference to FIG. 19) may include one or more perception units for viewing objects. The perception units are in communication (e.g., wirelessly) to one or more computer processing systems, in part, for identifying grasp locations. The system initially identifies whether the object is any of a category of objects having potentially poor pose authority. For example, objects that appear to be box-shaped or cube-shaped are analyzed for containing potentially exposed or lose flaps. FIG. 17A for example, shows an object 60 that is cube-shaped and includes three flaps 62 (two are shown) that are attached to a top 64 and that overlap a box base 66. The end-effector 34 may be selected to grasp the object 60 such that the first portion of the end-effector 34 contacts the base 66 and at least a portion of one of the flaps 62 along a short side 67 of the box 60 as shown in FIG. 17B. The second portion 38 of the end-effector 34 contacts the underside of the base 66.

Figure 18A:
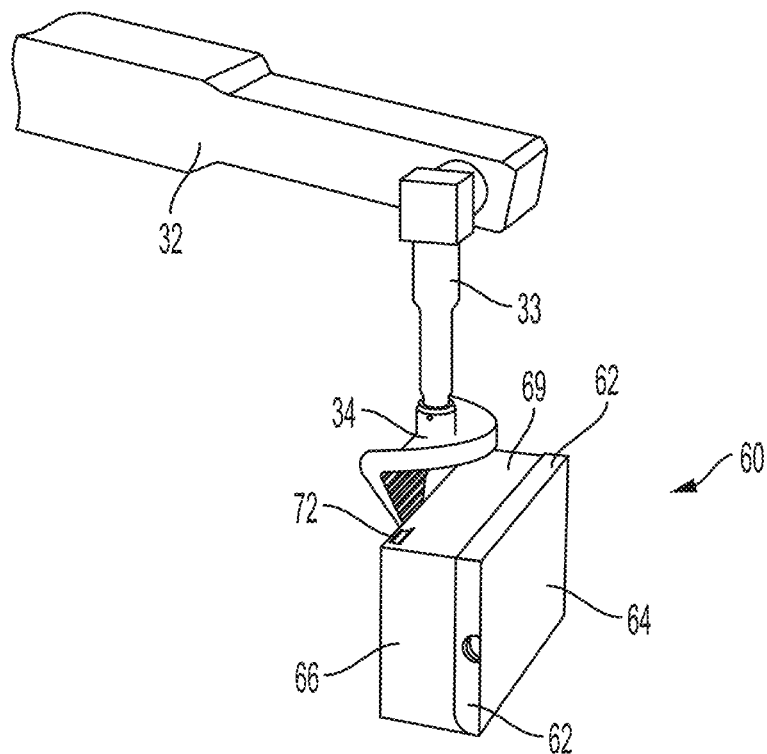
FIGS. 18A and 18B show illustrative diagrammatic views of an end-effector of FIG. 5 approaching a differently oriented box to be grasped (FIG. 18A) and grasping the differently oriented box (FIG. 18B)
Figure 18B:
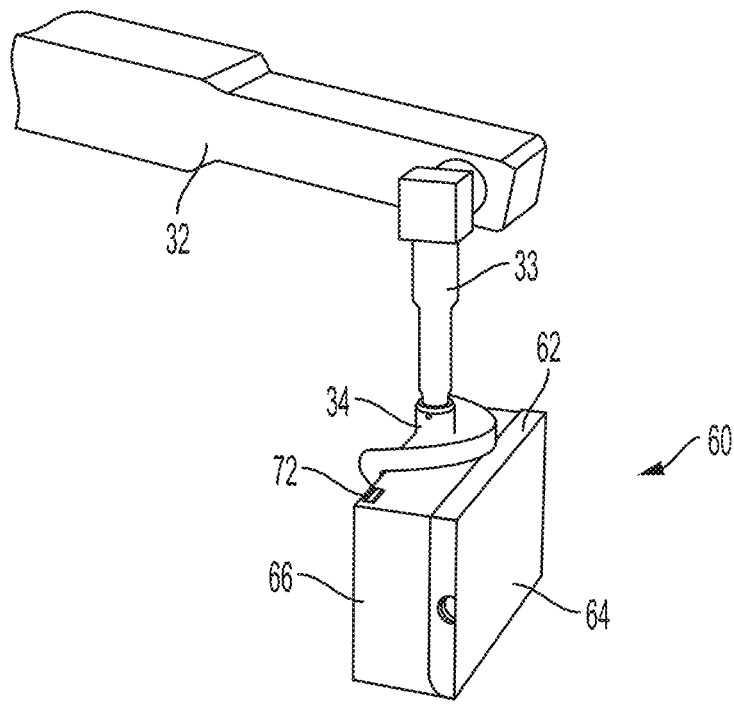

FIG. 18A also shows the object 60 that is cube-shaped and includes three flaps 62 (again, two are shown) that are attached to a top 64 and that overlap a box base 66. The end-effector 34 may similarly be selected to grasp the object 60 such that the first portion of the end-effector 34 contacts the base 66 and at least a portion of one of the flaps 62 along a long side 69 of the box 60 as shown in FIG. 18B. The second portion 38 of the end-effector 34 contacts the underside of the base 66. Additionally, identifying indicia 70 and/or 72 on the box (as shown in FIGS. 17A and 18A) may be identified by the object processing system. The identifying indicia may be used, in combination with a warehouse manifest, to determine a destination location for each box.

The system may therefore include one or more perception units located on or near an infeed conveyor for identifying indicia on an exterior of each of the bins, providing perception data from which the contents of the bin may be identified, and then knowing its relative position on the conveyor, track its location. It is assumed, in accordance with an aspect, that the bins of objects are marked in one or more places on their exterior with a visually distinctive mark such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects.

On the selected infeed conveyor at the object processing station, the perception system assists (using the central control system 100—e.g., one or more computer processing systems) the programmable motion device including the end-effector in locating and grasping an object in the infeed bin. In accordance with further aspects, each object may also be marked with a visually distinctive mark, again such as a barcode (e.g., providing a UPC code), QR code, or radio-frequency identification (RFID) tag or mailing label so that they may be sufficiently identified with a scanner for processing. The type of marking depends on the type of scanning system used, but may include 1D or 2D code symbologies. Again, multiple symbologies or labeling approaches may be employed on each object.

Figure 19:
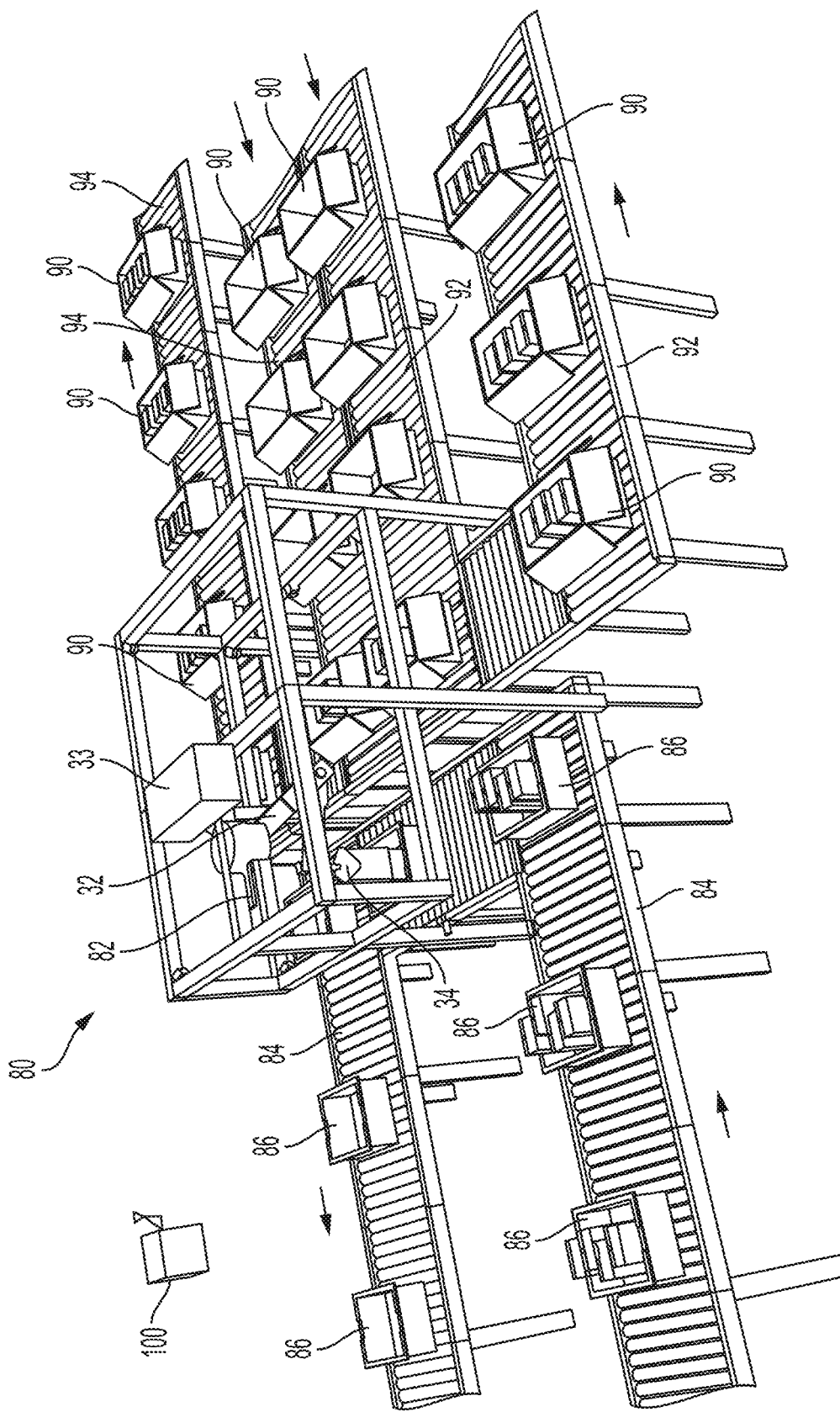
FIG. 19 shows an illustrative diagrammatic view of an object processing system with an end-effector of FIG. 5 in accordance with an aspect of the present invention.

With reference to FIG. 19, the object processing system 80 may include a perception system 82 that looks down in the object processing station and perceives perception data from one or more objects on an infeed conveyor 84. Objects to be processed may arrive on the infeed conveyor 84 in bins 86. Objects may be processed by placing each object into a designated destination location box 90 that my run along either of two output conveyors 92, 94. A vacuum source 33 provides the high flow vacuum to the end-effector. The perception system 82 is mounted above a bin of objects to be processed, and the perception system 82 may include (on the underside thereof), a camera, a depth sensor and lights. A combination of 2D and 3D (depth) data may be acquired. The depth sensor may provide depth information that may be used together with the camera image data to determine depth information regarding possible flaps on the various objects in view. The lights may be used to remove shadows and to facilitate the identification of edges of objects, and may be all on during use, or may be illuminated in accordance with a desired sequence to assist in object and flap identification. The system uses this imagery and a variety of algorithms to generate a set of candidate grasp locations for the objects that include a flap in the bin as discussed in more detail below.

The system will identify candidate grasp locations that include a portion of a flap on one or more objects, and may not try to yet identify a grasp location for the object that is partially obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, then it will either fail to acquire the object due to a bad grasp point where a vacuum seal will not occur, or it will acquire the object at a grasp location that is very far from the center of mass of the object, thereby inducing a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

Figure 20:
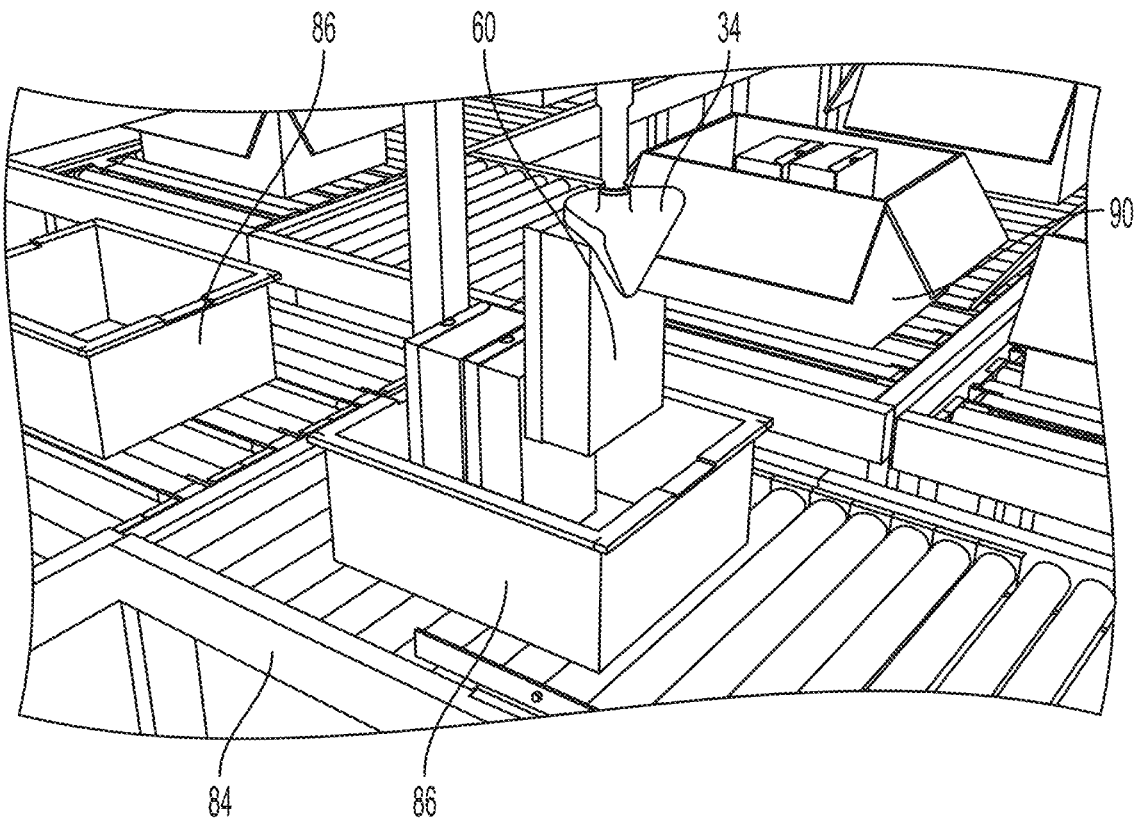
FIG. 20 shows an illustrative diagrammatic enlarged view of a portion of the system of FIG. 19 showing a box being lifted from a bin.
Figure 21:
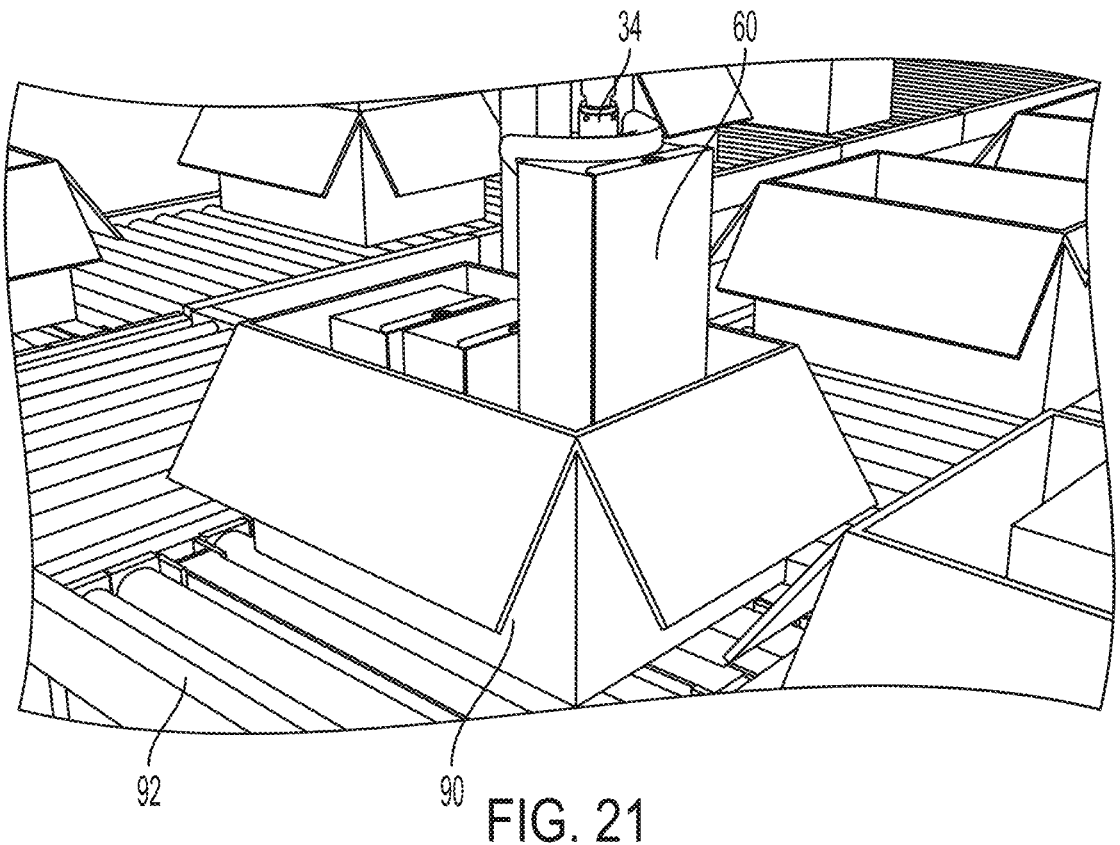
FIG. 21 shows an illustrative diagrammatic enlarged view of a further portion of the system of FIG. 19 showing a box being placed into a box.

With further reference to FIG. 20, an object 60 may be removed from a bin 86, and with reference to FIG. 21, the object 60 may be placed into the appropriate box 90. The conveyors 84, 92, 94 may include bi-direction sections to aid in turning, or may be provided as straight conveyors that are all within a reach of the articulated arm 32. Additional sensors may be provided along the conveyors to identify bins and boxes, and to track their locations.

Again, the operations of the system described above are coordinated with a central control system 100 that again communicates (e.g., wirelessly) with the articulated arm, the perception units, as well as in-feed conveyor and output conveyors. This system determines from symbol strings the UPC associated with a vendor bin, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 22:
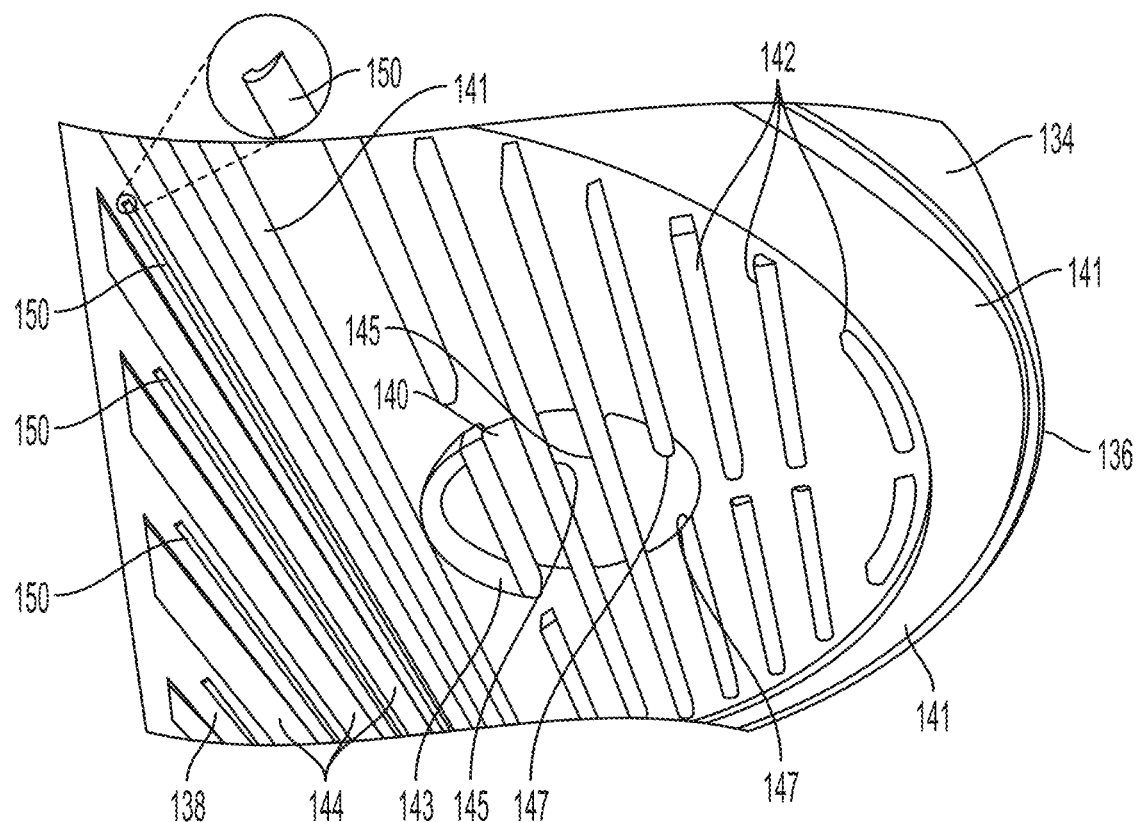
FIG. 22 shows an illustrative diagrammatic enlarged view of the end-effector in accordance with a further aspect of the present invention that includes barbs.
Figure 23:
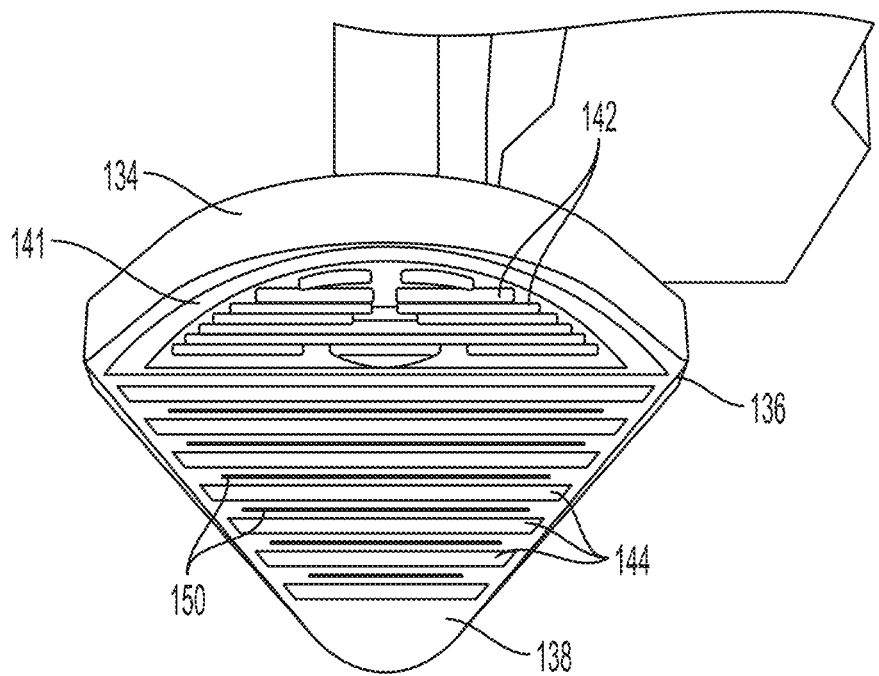
FIG. 23 shows an illustrative diagrammatic view of enlarged end view of the end-effector of FIG. 22.

FIG. 22 shows an underside view of an end-effector 134 in accordance with a further aspect of the invention that includes a first portion 136 including a vacuum opening 140 coupled to a vacuum source and through which a vacuum may be provided to an object. The first portion 136 further includes ridges 142 (some of which cross the opening 140), and the ridges facilitate distribution of the vacuum over a contact surface of the object. As also shown in FIG. 23, the second portion 138 of the end-effector 134 includes non-slip surfaces 144 formed, for example, of rubber, cork, adhesive, or electro-static material etc. as well as rows of angle barbs 150, that are angled upward toward the first portion 136 to engage a side of a box. FIG. 22 shows an enlarged view of the first portion 136 of the end-effector 134, and FIG. 23 shows an enlarged front view of the second portion 138 of the end-effector 134. A foam or rubber seal 141 may encircle the ridges 142 and aperture 140 on the underside of the first portion 136 to facilitate the application of a vacuum to an object. The height of the foam or rubber seal 141 may be at least as high as the height of the ridges 142.

Figure 24A:
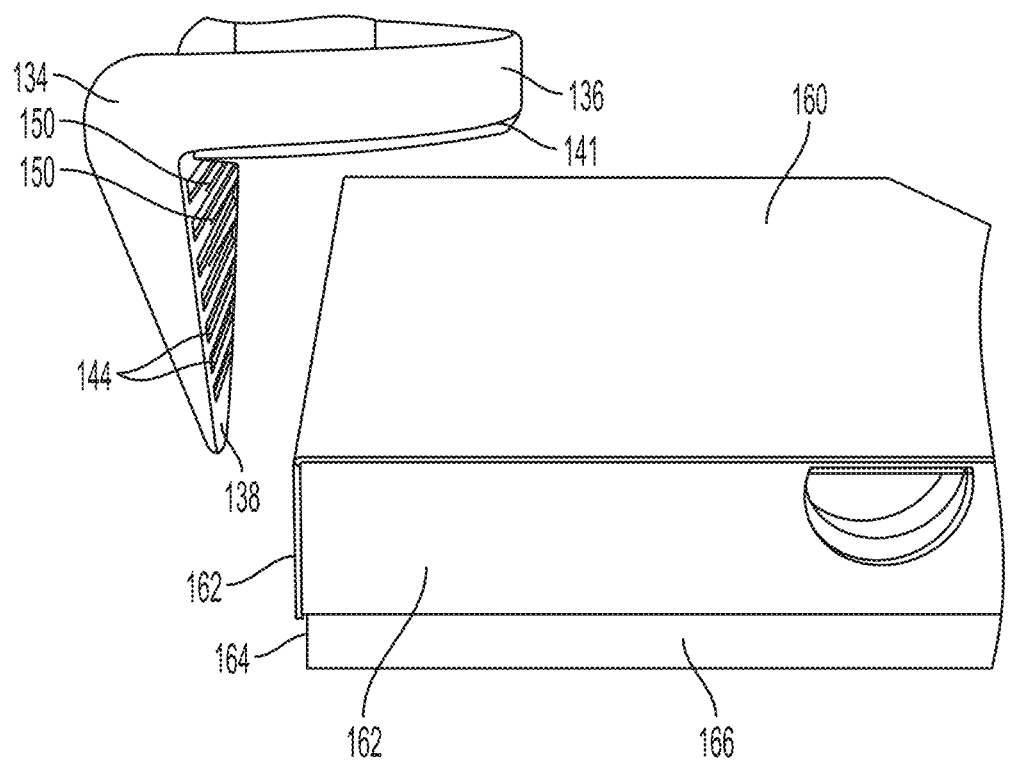
FIGS. 24A and 24B show illustrative diagrammatic views of an end-effector of FIG. 22 approaching a box to be grasped (FIG. 24A) and grasping the box (FIG. 24B)
Figure 24B:
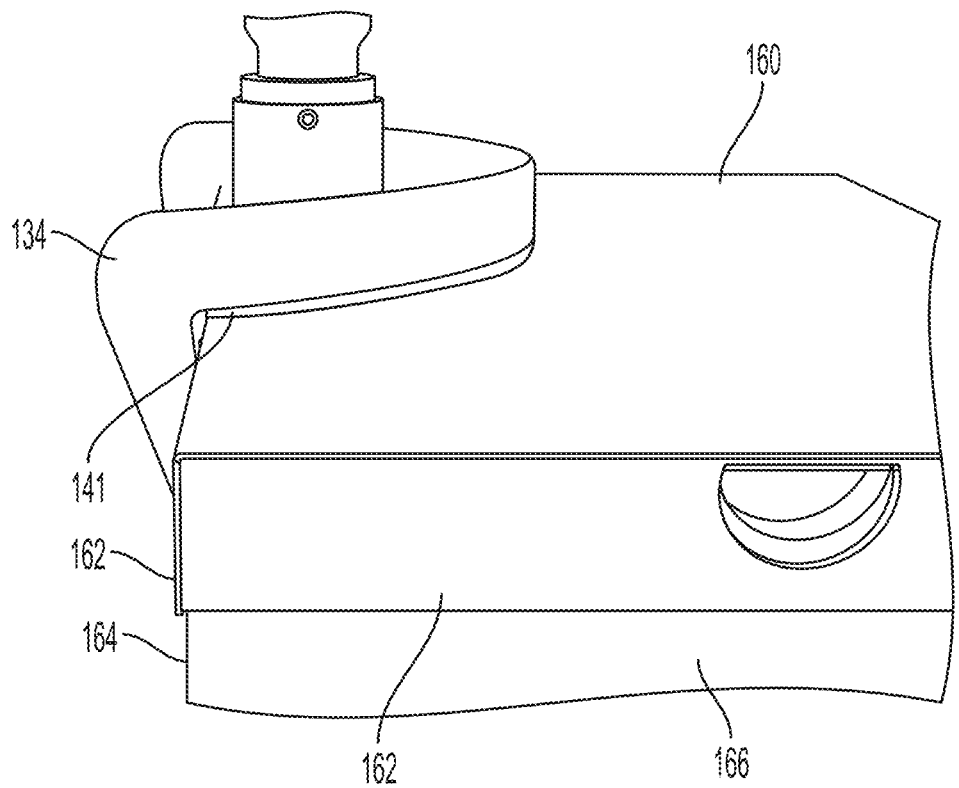

FIG. 24A shows the end-effector 134 approaching a box such that the ridges 142 on the first portion 136 will engage a top 160 of the box, and both the non-slip surfaces 144 and the rows of barbs 150 will engage both a portion of a flap 162 as well as a side wall 164 of a base 166 of the box as further shown in FIG. 24B. In this way, a box having low pose authority may even be grasped with the first portion 136 contacting the top 160 of the box since the second portion 138 may sufficiently engage the side wall 164 of the base 166. In accordance with certain aspects, the vacuum source may be switchable to change to a source of positive air pressure that is pushed from the source to the apertures to urge an object away from the contact surface in accordance with certain aspects of the invention.

Those skilled in the art will appreciate that numerous modifications and variations may be made to the above disclosed embodiments without departing from the spirit and scope of the present invention.

What is claimed is:

1. An end-effector for a programmable motion device, said end effector comprising a body that includes a first portion that defines a vacuum opening through which a vacuum from a vacuum source is applied to an object, and a second portion that grips the object, said first portion being orthogonal to the second portion,
   the first portion including a plurality of ridges configured on a surface of the first portion to distribute the vacuum over a contact surface of the object,
   wherein at least one of the ridges is configured to define a closed area over a portion of the vacuum opening to provide a vacuum seal between the first portion and the object, and
   wherein one or more other ridges are configured to define open areas that direct vacuum air flows to provide a high flow vacuum seal between the first portion and the object, wherein the one or more other ridges includes a ridge that extends across the vacuum opening to provide a vacuum flow in a linear direction along the ridge to an open end of the ridge.

2. The end-effector as claimed in claim 1, wherein the first portion is configured to contact at least part of a lid of the object.

3. The end-effector as claimed in claim 1, wherein the vacuum source is a high flow vacuum providing a vacuum pressure of no more than about 25,000 Pascals below atmospheric, with a maximum air flow rate of at least about 100 cubic feet per minute.

4. The end-effector as claimed in claim 1, wherein the second portion includes no-slip surfaces.

5. The end-effector as claimed in claim 1, wherein the second portion includes barbs.

6. The end-effector as claimed in claim 5, wherein at least one of the barbs is elongated.

7. An end-effector for a programmable motion device, said end-effector comprising a body that includes a first portion that defines a vacuum opening through which a vacuum is applied from a vacuum source to an object, the first portion being configured to contact at least part of a lid of the object, and the end effector further comprising a second portion that engages the object, the first portion being orthogonal to the second portion,
   wherein the first portion includes a plurality of ridges configured on a surface of the first portion,
   wherein the plurality of ridges includes a first ridge that extends across the vacuum opening to provide a first vacuum flow in a first direction along the first ridge to an open end thereof,
   a second ridge having at least two ridge portions separated by an opening defined therein therebetween to provide a second vacuum flow in a second direction through the opening in the second ridge that is orthogonal to the first direction, and
   a third ridge that forms a closed area over a portion of the vacuum opening through which a third vacuum flow is provided.

8. The end-effector as claimed in claim 7, wherein the second portion includes no-slip surfaces.

9. The end-effector as claimed in claim 7, wherein the second portion includes barbs.

10. The end-effector as claimed in claim 9, wherein at least one of the barbs is elongated.

11. The end-effector as claimed in claim 7, wherein the vacuum source is a high flow vacuum providing a vacuum pressure of no more than about 25,000 Pascals below atmospheric, with a maximum air flow rate of at least about 100 cubic feet per minute.

12. The end-effector as claimed in claim 7, wherein the first portion of the end-effector further includes a seal that encircles the plurality of ridges and the vacuum opening.

13. The end-effector as claimed in claim 7, wherein the plurality of ridges facilitate distribution of the vacuum to a surface of the object.

14. The end-effector as claimed in claim 7, wherein the end-effector further includes a coupling for connecting to an end-effector connection portion of the programmable motion device.

15. The end-effector as claimed in claim 7, wherein the third ridge that forms the closed area over the portion of the vacuum opening provides a greater seal against the object than any of the first ridge and the second ridge.

16. The end-effector as claimed in claim 15, wherein the first ridge that extends across the vacuum opening provides a greater seal against the object than the second ridge.

17. A programmable motion device for use in an object processing system, said programmable motion device comprising an end-effector that includes a body that includes a first portion that defines a vacuum opening through which a vacuum is applied from a vacuum source to an object, the first portion being configured to contact at least part of a lid of the object, and the end effector further comprising a second portion that engages the object, the first portion being orthogonal to the second portion, the first portion including a plurality of ridges configured on a surface of the first portion to distribute the vacuum over a contact surface of the object, wherein at least one of the ridges is configured to define a closed area over a portion of the vacuum opening to provide a vacuum seal between the first portion and the object, and wherein one or more other ridges configured to define open areas that direct vacuum air flows to provide a high flow vacuum seal between the first portion and the object, wherein the one or more other ridges includes a ridge having at least two ridge portions separated by an opening defined therebetween that extends across the vacuum opening to provide a vacuum flow in a direction through the opening in the ridge.

18. The programmable motion device as claimed in claim 17, wherein the vacuum source is a high flow vacuum providing a vacuum pressure of no more than about 25,000 Pascals below atmospheric, with a maximum air flow rate of at least about 100 cubic feet per minute.

19. The programmable motion device as claimed in claim 17, wherein the end-effector further includes a coupling for connecting to an end-effector connection portion of the programmable motion device.

20. The programmable motion device as claimed in claim 17, wherein the second portion includes no-slip surfaces.

21. The programmable motion device as claimed in claim 17, wherein the second portion includes barbs.

* * * * *